FIG. 1

INVENTOR
H. A. HELM
BY
ATTORNEY

3,319,223
ERROR CORRECTING SYSTEM
Harry A. Helm, Morristown, N.J., assignor to Bell Telephone Laboratories, Incorporated, New York, N.Y., a corporation of New York
Filed Mar. 31, 1964, Ser. No. 356,090
14 Claims. (Cl. 340—146.1)

This invention relates to information processing and, more particularly, to the automatic detection and correction of errors in digital information-processing systems.

In my copending application Ser. No. 132,925, filed Aug. 21, 1961, now U.S. Patent No. 3,273,119, issued Sept. 13, 1966, there is described an error control system in which a plurality of multidigit information characters followed by two associated multidigit check characters are sent from a transmitting terminal to a receiving terminal via a noisy or error-prone communication channel. In the receiving terminal two check characters are recalculated from the received information characters and then compared with the received check characters to indicate the presence or absence of errors in the received information characters. Moreover, inverse operations on the error signals (derived from the differences between the received and recalculated check characters) are arranged to generate the actual amount of the error in exact synchronism with reverse-order outpulsing of the information characters from a memory circuit to a utilization circuit, such that any single erroneous information character can be corrected before being supplied to the utilization circuit.

The system described in the noted application permits the correction of entire information characters or words and is not limited to the detection and correction of a single erroneous digit in a mutilated information character. Thus, for example, by appending two 8-digit check characters to a sequence of 255 information characters, it is possible to detect and correct the occurrence of any single erroneous information characters regardless of the number of faulty digits therein.

An object of the present invention is the improvement of error control systems.

More specifically, an object of this invention is the simplification of the error control system described in the aforenoted application.

These and other objects of the present invention are realized in a specific illustrative embodiment thereof that includes a transmitting or encoding terminal which comprises two check character generating circuits each responsive to a plurality or block of information characters to generate a multidigit check character. One of these generating circuits iteratively adds together the information characters applied thereto to form one of the check characters, and the other circuit performs iterative sequential operations on the applied information characters to generate the second check character. The two check characters are then appended by a distributor to the block of information characters from which they were derived. This redundant sequence comprises a message block which is applied via transmitting equipment to a noisy communication channel for propagation to a receiving terminal.

In the receiving or decoding terminal the information characters of a message block are applied via a distributor to a memory circuit which is characterized by a delay approximately equal to the period of a message block. The information characters are simultaneously applied to each of two check character recalculating circuits that are respectively identical to the check generating circuits included in the transmitting terminal. In response to the received information characters these check circuits recalculate two characters in accordance with the same checking relationships embodied in the transmitting terminal. If the information characters are received error-free, the recalculated check characters will, of course, be identical to those originally generated at the transmitter.

In addition, the check characters received by the decoding terminal are routed by the receiving distributor to the respective check character recalculating circuits. As a result, each checking circuit supplies an error signal which is the difference between the associated received check character and the corresponding recalculated check character. These error signals are then respectively applied to first and second error checking circuits which are identical to the aforementioned check character generating units. In turn, the respective outputs of the error checking circuits are connected to a comparator circuit.

In approximate time coincidence with the outpulsing from the memory circuit of the first received information character, the comparator circuit is triggered to compare the respective signal outputs of the two error checking circuits. If these outputs are not identical, the comparator circuit does not provide an enabling signal output and, as a result, the first information character is delivered in unmodified form to an output utlization circuit. If, on the other hand, the outputs of the two error checking circuits are identical and non-zero (indicative of an erroneous first information character) the comparator circuit provides an enabling signal output which causes the output of the first error checking circuit to be applied to a modification circuit wherein the first information character is selectively modified before being supplied to the utilization circuit.

Assume, however, that the signal outputs of the two error checking circuits are initially non-zero and not identical, indicative of one of the information characters subsequent to the first one being in error. In that case the following procedure is followed. Prior to the outpulsing from the memory circuit of each information character subsequent to the first one, the output of the second error checking circuit is modified in accordance with a predetermined linear sequential operation. In this way the output of the second error checking circuit is repeatedly modified until it eventually agrees with the output of the first error checking circuit. This identity of outputs, which occurs at the time that the erroneous information character is being outpulsed, energizes the comparator circuit to cause the output of the first error circuit to be applied to the modification circuit to selectively alter the erroneous information character, so as to provide a corrected version thereof.

It is a feature of the present invention that the two check character generating circuits included in the transmitting terminal are respectively identical in configuration to the two check character recalculating circuits and the two error checking circuits included in the receiving terminal.

It is another feature of this invention that the memory circuit included in the receiving terminal is a simple delay buffer from which information characters are continuously outpulsed to a utilization circuit in the order in which they are received by the terminal, with the only delay between the application of a message block to the terminal and the providing of corrected information characters therefrom being the period of a single message block.

A complete understanding of the present invention and of the above and other objects, features and advantages thereof may be gained from a consideration of the following detailed description of an illustrative embodiment thereof presented hereinbelow in connection with the accompanying drawing, in which:

Before proceeding to a detailed description of the specific illustrative system shown in the drawing, it will be helpful by way of background to reemphasize briefly some of the basic concepts described in my aforeidentified copending application and, in addition, to present the basic ideas embodied in the present invention.

An $n$-digit binary information character can be represented by a polynomial of the form $$a_0 + a_1 x + a_2 x^2 + \ldots + a_{n-1} x^{n-1} \quad (1)$$

wherein each $a_i$ is either "0" or "1," depending respectively on the value of the corresponding digit in the represented character. Thus, for example, the 8-digit character 10011101 can be represented by the following polynomial:

$$1 + 0x + 0x^2 + 1x^3 + 1x^4 + 1x^5 + 0x^6 + 1x^7 \quad (2)$$

which can be written as:

$$1 + x^3 + x^4 + x^5 + x^7 \quad (3)$$

To develop an error correcting code it is necessary to define some arithmetic operations for such polynomials, so that the equivalent of a parity check can be made on the represented characters. In particular, addition and multiplication are needed for the purposes of this invention.

Addition of polynomials is carried out according to the arithmetic of integers modulo 2. In this arithmetic $$\begin{aligned} 1+1 &= 0 \\ 1+0 &= 1 \\ 0+0 &= 0 \end{aligned} \quad (4)$$

Therefore, for example, $$(1+x^3+x^4+x^5+x^7)+(1+x^5+x^7)=(x^3+x^4) \quad (5)$$

According to these arithmetic rules one can add two polynomials respectively representative of two $n$-digit binary characters and obtain a sum which is interpretable as another $n$-digit binary character.

Multiplication of polynomials of the form mentioned above may result in a product which is not representable by a polynomial of the same degree. For example, the product of two 8-digit characters $1+x^2+x^5$ and $x^3$ is $$x^3+x^5+x^8 \quad (6)$$

To represent this product requires a 9-digit character which, of course, is not an allowed element of our assumed 8-digit code. To avoid this difficulty, the term or terms of degree greater than the maximum permitted by the code being represented are each replaced by a given linear combination of terms of degree less than the maximum. Advantageously, this combination is derived from a irreducible polynomial which includes a term of the same degree as that which is to be replaced. For example, it is known (see R. Church, Tables of Irreducible Polynomials for the First Four Prime Moduli, Annals of Mathematics, vol. 36, No. 1, January 1935) that $x^8+x^4+x^3+1=0$ is an irreducible polynomial. By adding $x^8$ to each side of this polynomial one obtains $$x^8 = x^4+x^3+x+1 \quad (7)$$

Therefore, by substituting for $x^8$ in expression (6) the value given by expression (7) the product of the two above-assumed 8-digit characters may be rewritten as:

$$x^5+x^4+x+1 \quad (8)$$

If the degree of an irreducible polynomial is $n$, there are $2^n - 1$ possible polynomials or characters in the code set associated with that polynomial. Thus, associated with the irreducible polynominal $x^8+x^4+x^3+x+1=0$ is a code set of $2^8 - 1$ or 255 possible characters. A property of interest is how many of these $2^n - 1$ possible characters can be obtained by successive multiplication by $x$. For example, if one starts with "1" as representative of the first character of a set, another character representation can be obtained by multiplying 1 by $x$ and still another character can be obtained by multiplying $x$ by $x$ and so forth. If all possible polynomials of the set can be obtained in this way we say that the irreducible polynomial associated with the set has a primitive root. To determine whether an irreducible polynomial has a primitive root, reference may be made, for example, to the aforecited tables by Church.

The principels summarized above can be applied to the development of an error detecting and correcting code. To do so, first choose an irreducible polynomial of degree $n$ which has a primitive root. The code set associated therewith contains $2^n - 1$ different possible characters, each containing $n$ digits. Each redundant sequence formed in accordance with such a code contains $2^n - 1$ information characters followed by 2 check characters. For example, since the irreducible polynomial $$x^8+x^4+x^3+x+1=0$$

has a primitive root, the sequence length (number of information and check characters) of the code derived there from would be 257 characters. This is far too large a number for a readily understandable example to be constructed. Therefore, let us take as a starting point a lower degree irreducible polynomial which has a primitive root. Such a polynomial is:

$$x^3+x+1=0 \quad (9)$$

Since the degree of polynomial (9) is 3, each element of the code set associated therewith is a 3-digit binary character and there are $2^3-1$ or 7 non-zero different possible characters. The 7 possible 3-digit characters and the respective polynomial representations thereof are listed in Table I below:

TABLE I

| Binary Characters | Polynomials |
|---|---|
| 1 0 0 | 1 |
| 0 1 0 | $x$ |
| 0 0 1 | $x^2$ |
| 1 1 0 | $x^3 = x+1$ |
| 0 1 1 | $x^4 = x^2+x$ |
| 1 1 1 | $x^5 = x^2+x+1$ |
| 1 0 1 | $x^6 = x^2+1$ |

Table I makes it apparent that all characters of the depicted code set are obtainable by successive multiplications by $x$. This verifies the fact that polynomial (9) has a primitive root.

If the bottom-most polynomial in Table I is multiplied by $x$, the result is $$x^7 = x^3 + x = 1 \quad (9a)$$

which demonstrates that the listed polynomials as related by the operator $x$ comprises a closed loop sequence. This property of the polynomials, which is described in more detail below, is taken advantage of in the error correcting procedure to identify which particular one of the received information characters is in error.

Now assume that it is desired to send 3-digit information characters from a transmitter to a receiver. Each group of 7 information characters transmitted therebetween will have appended thereto two 3-digit check characters, thereby forming a redundant message block 9 characters in length. Such a message block has embodied in it the capability to detect and correct any single erroneous information character, whether 1, 2 or all 3 of the digits thereof are in error.

Assume that the 7 randomly-selected 3-digit information characters listed in Table II below are to be transmitted between the transmitting terminal 100 shown in FIG. 1 and the receiving terminal shown in FIG. 2.

TABLE II

| Information Characters |
| --- |
| $z_1 = x^2 + x$ = 011 |
| $z_2 = 1$ = 100 |
| $z_3 = x + 1$ = 110 |
| $z_4 = x^2 + 1$ = 101 |
| $z_5 = x$ = 010 |
| $z_6 = x$ = 010 |
| $z_7 = x^2 + x + 1$ = 111 |

In Table II these characters are designated $z_1$ through $z_7$ and their respective corresponding polynomial representations are also shown there. The first information character to be applied from the terminal 100 to a communication channel 150 is $z_1$, and $z_7$ designates the last information character of a message block to be so applied.

In accordance with the principles of the present invention two 3-digit check characters $y_1$ and $y_2$ are generated in the transmitting terminal 100 and then appended to the 7 information characters shown in Table II. These check characters are defined by the following relationships:

$$y_1 = \sum_{i=1}^{2^n-1} z_i \quad (10)$$

and $$y_2 = \sum_{i=0}^{2^n-2} A^{2^n-1-i} z_{i+1} \quad (11)$$

where A represents any arithmetic operation which has mathematical significance with respect to the allowed code words. One such operation can in general be defined as that operation which translates each code word in the code representation used into a unique one other code word. Thus the operation A relates all of the possible code words in a closed loop sequence in which none of the code words are missing and in which each code word can be obtained by performing the operation A on the preceding code word. Such closed loop sequences of code words are described in an article by R. C. Bose and D. K. Roy-Chaudhuri, entitled "On a Class of Error Correcting Binary Group Codes," appearing at pages 68 through 79 of Information and Control, vol. 3, No. 1, March 1960, and have been called Bose-Chaudhuri codes. In the specific illustrative example considered herein, the operator A is simply $x$.

Expression (10) for calculating the first check character $y_1$ specifies that this character is formed by simple iterative addition of the $2^n-1$ information characters. In the particular case considered herein, $y_1$ is simply the sum of the 7 information characters $z_1$ through $z_7$.

The second check character $y_2$ defined by expression (11) is formed by multiplying $z_1$ by $x$, then adding $z_2$ to the product and again multiplying by $x$, and so forth, as represented in detail below.

$$z_1$$
$$xz_1 + z_2$$
$$x^2 z_1 + xz_2 + z_3$$
$$x^3 z_1 + x^2 z_2 + xz_3 + z_4$$
$$x^4 z_1 + x^3 z_2 + x^2 z_3 + xz_4 + z_5$$
$$x^5 z_1 + x^4 z_2 + x^3 z_3 + x^2 z_4 + xz_5 + z_6$$
$$x^6 z_1 + x^5 z_2 + x^4 z_3 + x^3 z_4 + x^2 z_5 + xz_6 + z_7$$
$$y_2 = x^7 z_1 + x^6 z_2 + x^5 z_3 + x^4 z_4 + x^3 z_5 + x^2 z_6 + xz_7$$
$$= z_1 + x^6 z_2 + x^5 z_3 + x^4 z_4 + x^3 z_5 + x^2 z_6 + xz_7$$

The check characters $y_1$ and $y_2$ which are to be appended to the particular 7 information characters shown in Table II are listed below in Table III.

TABLE III

| Check Characters |
| --- |
| $y_1 = x^2 + x = 011$ |
| $y_2 = x^2 + x = 011$ |

It is convenient to represents the message block comprising the information characters $z_1$ through $z_7$ and the check characters $y_1$ and $y_2$ in vector form as follows:

$$\begin{bmatrix} z_1 \\ z_2 \\ z_3 \\ z_4 \\ z_5 \\ z_6 \\ z_7 \\ y_1 \\ y_2 \end{bmatrix} = \begin{bmatrix} x^2+x \\ 1 \\ x+1 \\ x^2+1 \\ x \\ x \\ x^2+x+1 \\ x^2+x \\ x^2+x \end{bmatrix} \quad (12)$$

Error detection of the message block depicted above can be represented as being accomplished by means of a check matrix of the following form:

$$\begin{bmatrix} 1 & 1 & 1 & 1 & 1 & 1 & 1 & 1 & 0 \\ 1 & x^6 & x^5 & x^4 & x^3 & x^2 & x & 0 & 1 \end{bmatrix} \quad (13)$$

Matrix (13) is derived in a straightforward manner from the relationships (10) and (11) for computing $y_1$ and $y_2$ for if one multiplies a received message vector such as (12) by the matrix (13) by the well known rules of matrix multiplication, the first row of (13) computes a first error expression $e_1$ defined as follows:

$$e_1 = \sum_{i=1}^{2^n-1} z_i + y_1 \quad (14)$$

and the second row computes a second error expression $e_2$ where $$e_2 = \sum_{i=0}^{2^n-1} A^{2^n-1-i} z_{i+1} + y_2 \quad (15)$$

More formally, $$\begin{bmatrix} e_1 \\ e_2 \end{bmatrix} = \begin{bmatrix} 1 & 1 & 1 & 1 & 1 & 1 & 1 & 1 & 0 \\ 1 & x^6 & x^5 & x^4 & x^3 & x^2 & x & 0 & 1 \end{bmatrix} \begin{bmatrix} z_1 \\ z_2 \\ z_3 \\ z_4 \\ z_5 \\ z_6 \\ z_7 \\ y_1 \\ y_2 \end{bmatrix} \quad (16)$$

For any correctly-received message block $e_1$ and $e_2$ are each "0." However, suppose that a noise burst $N = x^2 + x$ occurs in the third information character $z_3$. As a result $$z_3 + N = z_3 + (x^2 + x) = x^2 + 1 = 101 \quad (17)$$

is applied to the receiving terminal 200 instead of the information character 110 originally supplied to the channel 150 by the transmitting terminal 100. Matrix multilication of the check matrix (13) by this erroneous received message block is represent below:

$$\begin{bmatrix} 1 & 1 & 1 & 1 & 1 & 1 & 1 & 0 \\ 1 & x^6 & x^5 & x^4 & x^3 & x^2 & x & 0 & 1 \end{bmatrix} \begin{bmatrix} x_2+x \\ 1 \\ x^2+1 \\ x^2+1 \\ x \\ x \\ x^2+x+1 \\ x_2+x \\ x^2+x \end{bmatrix}$$

$$= \begin{bmatrix} x^2+x \\ x^2 \end{bmatrix} = \begin{bmatrix} N \\ Nx^5 \end{bmatrix} \quad (18)$$

It is significant to note that the value of the noise burst is some polynominal N is alway given by the top row of the product shown in matrix form in (18.)

Figure 1:
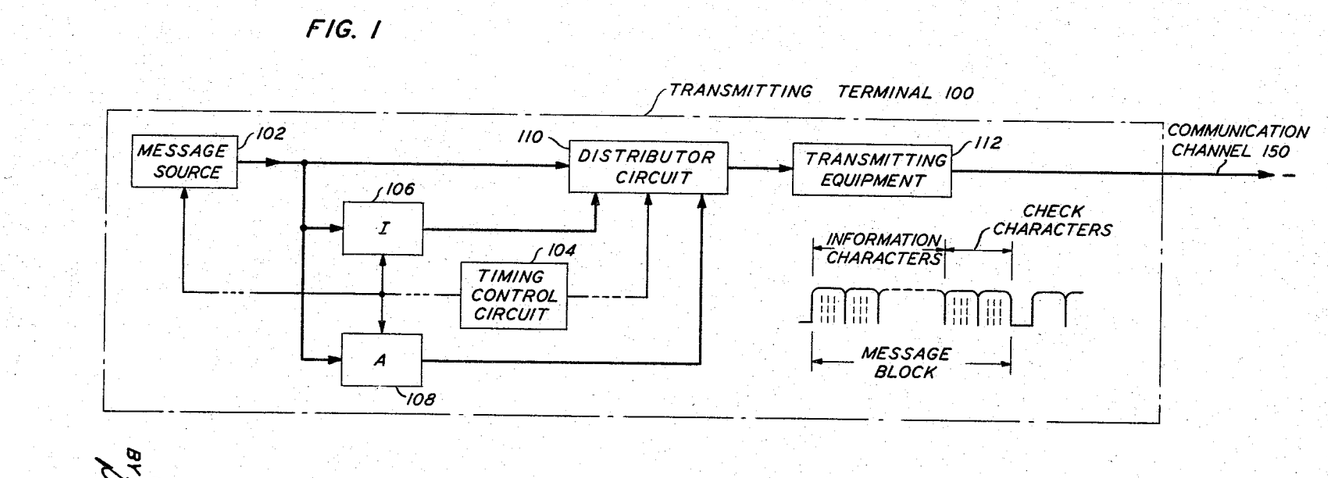
FIGS. 1 and 2 show, respectively, a transmitting terminal and a receiving terminal which together comprise a specific illustrative error correcting system made in accordance with the principles of the present invention.
Figure 2:
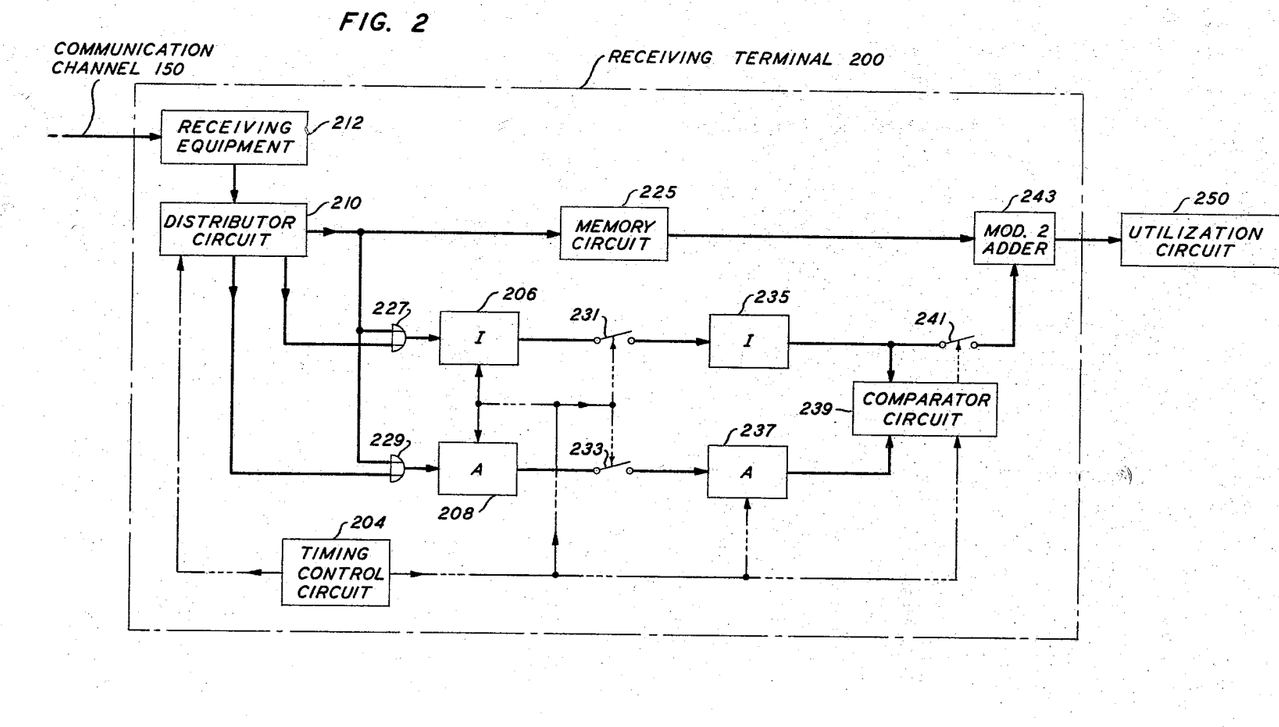

It is also possible to determine which particular one of the information characters was mutilated during transmission between the transmitting and receiving terminals shown in FIGS. 1 and 2, respectively. This is accomplished by testing the top and bottom rows of the product in (18) for equality. If the rows had been equal and non-zero, the error burst would have been determined to have occurred in the first information character. Since they are in fact not equal, the bottom row of the product is multiplied by $x$ to give:

$$\begin{bmatrix} N \\ Nx^6 \end{bmatrix} \quad (19)$$

which is again tested for the existence of an equality between the top and bottom rows. Since the rows are seen to be not equal, the process of multiplying the bottom row by $x$ is repeated, giving $$\begin{bmatrix} N \\ Nx_7 \end{bmatrix} = \begin{bmatrix} N \\ N \end{bmatrix} \quad (20)$$

Thus, the *third* test indicates equality between the rows, which signifies that the error is in the *third* information character $z_3$. By adding N to $z_3$, the error is corrected and a corrected version of the received character $z_3$ is then available in the receiving terminal 200 (FIG. 2) for application to an output utilization circuit 250.

It is noted that the procedure described above is applicable to the correction of either an information character or a check character. This is so because the occurrence of an error in a check character is indicated by a vector in which either $e_1$ or $e_2$ is zero, but not both.

Turn now to the specific illustrative error control embodiment of the above principles, which is shown in FIGS. 1 and 2. The transmitting terminal 100 of FIG. 1 includes a message source 102 for supplying in sequence the seven information characters $z_1$ through $z_7$ listed in Table II. In response to signals supplied from a conventional timing control circuit 104, the source 102 supplies equal-length information blocks each seven characters long, with a guard space of at least two character lengths between adjacent blocks. Although, for simplicity, only a single lead is shown emanating from the source 102, it is to be understood that the source may be adapted to provide character signals either in serial form on a single lead or in parallel form on a plurality of leads. In the particular circuits shown in FIGS. 3 and 4, and described below, the parallel mode of operation is assumed.

Figure 3:
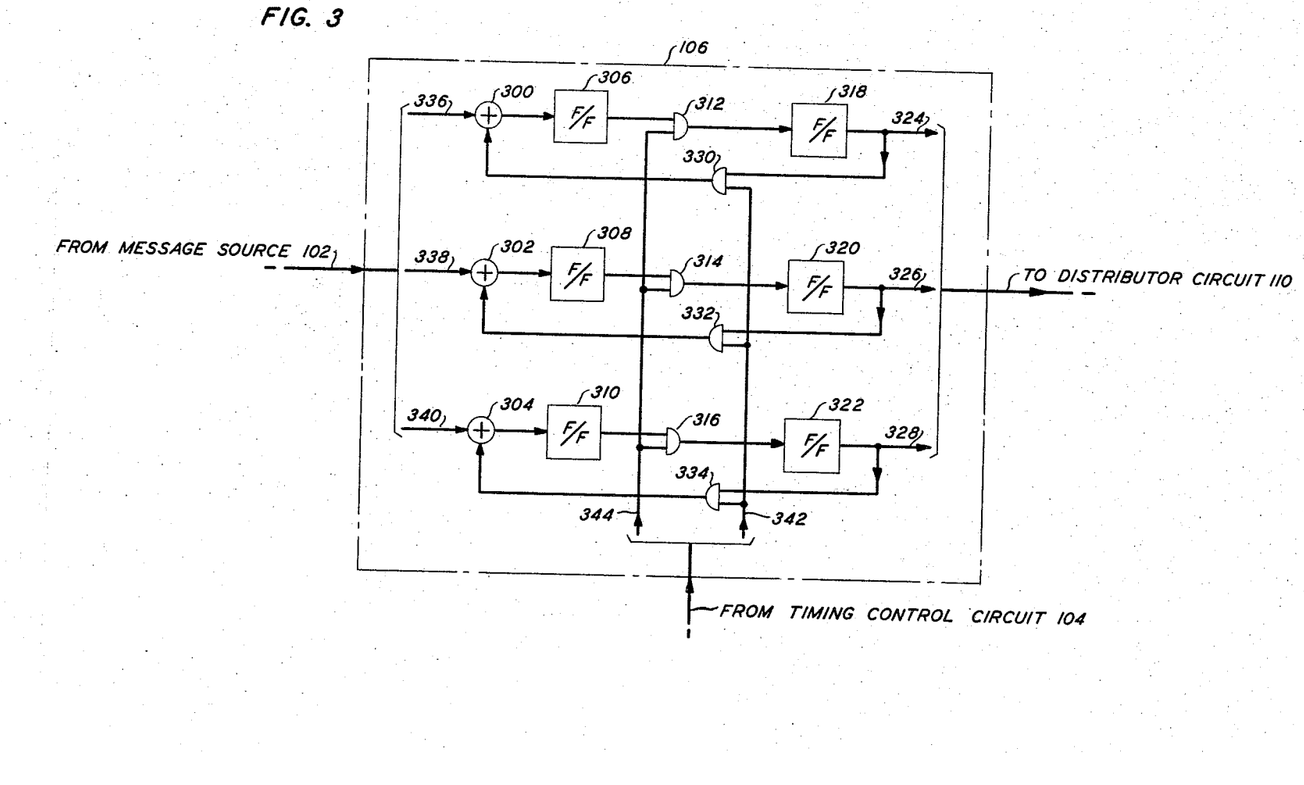
FIGS. 3 and 4 depict two illustrative circuits which are included at three different places in the over-all system shown in FIGS. 1 and 2 to perform character-generating, character-recalculating and error-checking functions therein.
Figure 4:
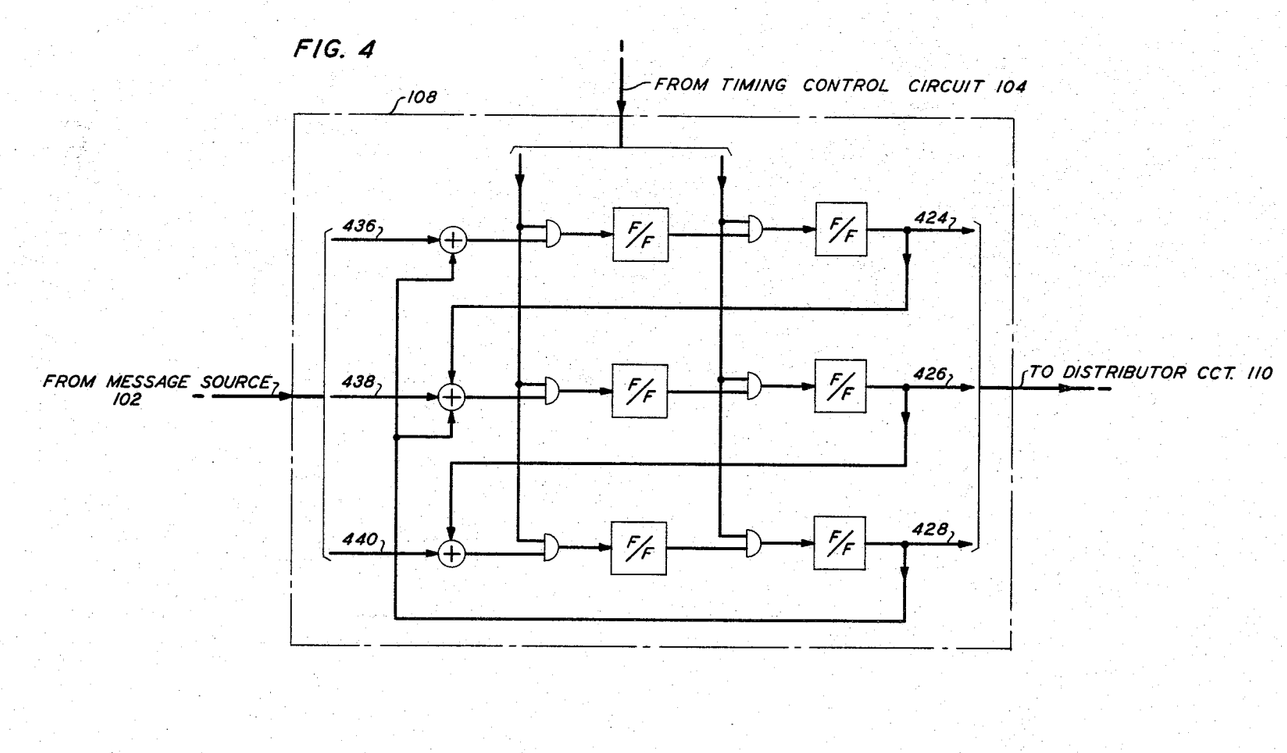

The information characters emitted by the message source 102 are supplied to first and second check character generating circuits 106 and 108 whose configurations are shown in FIGS. 3 and 4, respectively. The circuit 106, which is controlled by timing signals from the circuit 104, is labeled with the letter I to signify that the identical information characters supplied by the source 102 are simply iteratively added together by the circuit 106 without being modified in any way. On the other hand, the circuit 108 is designated with the letter A to indicate that the information characters from the source 102 are mathematically transformed before being added together. As described in detail below, the circuit 108 is controlled by the timing circuit 104 to perform an iterative sequential operation on information characters applied thereto.

The information characters supplied by the message source 102, and the two check characters respectively generated by the circuits 106 and 108, are applied to a distributor circuit 110 which, under the control of signals from the timing circuit 104, appends the two check characters to the associated group of seven information characters. In particular, the check characters are timed to occur in the aforementioned guard spaces between successive blocks of information characters. It is noted that the distributor circuit 110 may be a mechanical commutator of the type described in my aforementioned copending application, or may comprise an electronic commutator of any of the forms well known in the art.

The output of the distributor circuit 110 of FIG. 1 is applied to transmitting equipment 112 which may include modulators, amplifiers, multiplexing equipment or any other facilities necessary to prepare the signals for application to the channel 150. The channel 150 may comprise a transmission medium such as a telephone or teletypewriter line, a high-frequency coax or other wave guiding medium, or even a radio link without an actual physical connection between the transmitting and receiving terminals described herein. Furthermore, the channel 150 may not even be a transmission link but may instead be a storage medium such as a magnetic tape or drum.

The first check character generating circuit 106 shown in block diagram form in FIG. 1 is depicted in detail in FIG. 3 for the particular case in which the three digits of an information character are simultaneously applied in parallel to three signal-carrying leads. The FIG. 3 arrangement includes three EXCLUSIVE-OR circuits 300, 302 and 304, each of which produces an output signal if one and only one of its inputs is energized. Such logical circuits are well known in the art, forming a basic element of most binary adders.

The output leads of the EXCLUSIVE-OR circuits 300, 302 and 304 shown in FIG. 3 are respectively connected to three input flip-flop circuits 306, 308 and 310 whose output leads in turn are coupled via a first set of gating circuits 312, 314 and 316 to the respective inputs of three output flip-flop circuits 318, 320 and 322. The outputs of these last-mentioned flip-flop circuits are applied to the distributor circuit 110 (FIG. 1) via output leads 324, 326 and 328 and, in addition, are applied via a second set of gating circuits 330, 332 and 334 to respective inputs of the EXCLUSIVE-OR circuits 300, 302 and 304.

The check character generating circuit 106 shown in FIG. 3 functions as an iterative adder, providing on its output leads 324, 326 and 328 signals representative of the cumulative sum of signals applied to input leads 336, 338 and 340. For example, assume that the output flip-flops 318, 320 and 322 are initially reset by circuitry (not shown) to the states wherein they have stored therein three "0" representations and, furthermore, that information character signals representative of the digits "1," "0" and "1" are respectively applied to input leads 336, 338 and 340. In response to a momentary pulse-type timing signal on lead 342, the aforementioned "0" representations of the flip-flops 318, 320 and 322 are gated via the units 330, 332 and 334 to appear as inputs to the EXCLUSIVE-OR circuits 300, 302 and 304. As a result, the input flip-flops 306, 308 and 310 are triggered to their "1," "0" and "1" states, respectively. Subsequently, a second momentary pulse-type timing signal is applied to lead 344 to gate the representations of the flip-flops 306, 308 and 310 to the output flip-flops 318, 320 and 322.

Now assume that a second group of information signals representative of the digits "1," "1" and "1" are respectively applied to the input leads 336, 338 and 340 of FIG. 3. In response to another timing signal on the lead 342 the "1," "0" and "1" representations stored in the output flip-flops 318, 320 and 322 are gated to appear as inputs to the EXCLUSIVE-OR circuits 300, 302 and 304. As a result, the flip-flops 306, 308 and 310 are triggered to their "0," "1" and "0" states, respectively. Subsequently, these representations are gated to the output flip-flops 318, 320 and 322, whereby there is provided on the leads 324, 326 and 328 a 010 output representation. This representation is seen to be the sum (formed according to the arithmetic rules set forth above) of the input characters 101 and 111. Successive applications of other input signal characters will in each case provide on the leads 324, 326 and 328 output signals representative of the cumulative sum thereof. In particular, if the information characters $z_1$ through $z_7$ shown in Table II are applied in sequence to the inputs of the circuit 106 shown in FIG. 3, the final sum thereof is 011 which is the value of $y_1$ given in Table III for the 3-digit check character generated by the circuit 106.

The second check character generating circuit 108 shown in block diagram form in FIG. 1 is depicted in detail in FIG. 4. The FIG. 4 arrangement is also composed of EXCLUSIVE-OR circuits, gating units and flip-flops, and the interconnections thereamong are such that in response to the application thereto of successive information character signals and timing signals there appear on output leads 424, 426 and 428 signals representative of the check character $y_2$ defined by expression (11). This may be easily verified by actually applying each of the information characters $z_1$ through $z_7$ of Table II in sequence to input leads 436, 438 and 440 and tracing through the operation of FIG. 4 in a manner analogous to that described above in connection with the operation of FIG. 3. Furthermore, it is noted that the FIG. 4 arrangement is essentially the same as the circuit shown in FIG. 3B of my aforenoted copending application and described therein.

The receiving terminal 200 shown in FIG. 2 includes conventional receiving equipment 212 to which a redundant message block including $2^n-1$ information characters and two associated check characters is applied from the channel 150 for demodulation, amplification or any other process required to place the transmitted signals in their original form.

The output of the receiving equipment 212 of FIG. 2 is applied to a distributor circuit 210 which is controlled by timing signals applied thereto from a conventional control circuit 204 to operate in synchronism with the distributor circuit 110 included in the transmitting terminal 100 of FIG. 1.

The received information characters of a message block are delivered from the distributor circuit 210 to a memory circuit 225 which may, for example, comprise a delay line having a delay approximately equal to the period of a received message block. The received information characters are also delivered via an OR gate 227 to an iterative adder circuit 206 which may be identical to the circuit 106 in the transmitting terminal 100. Also the received information characters are simultaneously applied via an OR gate 229 to a linear sequential circuit 208 which may be identical to the circuit 108 of FIG. 1.

The circuit 206 recalculates a check character $y_1'$ in accordance with the information characters applied thereto while the circuit 208 recalculates a check character $y_2'$ in accordance with the received information characters. Subsequently, the received check character $y_1$ is applied from the distributor 210 to the recalculating circuit 206 and the received check character $y_2$ is applied to the recalculating circuit 208. The received check characteas are respectively added (modulo 2) to the recalculated check characters so as to produce an indication of error. It is readily apparent that if no error whatever occured in transmission along the channel 150, the recalculated check characters derived by the circuits 206 and 208 will be equal to the received check characters. Hence the respective modulo 2 sums of the recalculated check characters and the received check characters will produce respective "0" outputs from the circuits 206 and 208 after all these additions are completed. If, on the other hand, an error occurred in an information character during transmission, the respective modulo 2 outputs of the circuits 206 and 208 will not be "0."

At a predetermined later time $t_1$ switches 231 and 233 are momentarily closed by control signals from the timing circuit 204, whereby the outputs of the recalculating circuits 206 and 208 are transferred to two error checking circuits 235 and 237, respectively, which may be identical to the circuits shown in detail in FIGS. 3 and 4. The signals initially applied to the inputs of the circuits 235 and 237 appear at the outputs thereof and are compared by a comparator circuit 239 which closes associated switch 241 only if the compared signals are equal.

During a predetermined interval starting at the time $t_1$, the first information character stored in the memory circuit 225 appears at the output thereof and is applied to a modulo 2 adder 243 for application to the utilization circuit 250. If the switch 241 is not closed during this interval, the first information character is passed unmodified through the adder 243. If, however, the switch 241 is closed during that time, the output of the adder 243 is selectively modified in accordance with the output of the error checking circuit 235, whereby a corrected version of the first information character is then delivered to the circuit 250.

Assume that at time $t_1$ the outputs of the error checking circuits 235 and 237 are non-zero and not identical, indicative of an error having occurred in an information character subsequent to the first one. In response thereto, the switch 241 is not closed and the first information character is passed in unmodified form from the memory circuit 225 via the adder 243 to the utilization circuit 250. Subsequently at time $t_2$ the circuit 237 is activated by timing signals from the control circuit 204, whereby the output representation of the circuit 237 is multiplied by $x$ and then compared by the circuit 239 with the constant output of the circuit 235. If the circuit 239 senses a lack of identity between the respective outputs of the circuits 235 and 237, the switch 241 remains open and the second information character is also passed in unmodified form from the memory circuit 225 to the utilization circuit 250.

At time $t_3$ the circuit 237 is again activated by timing signals from the circuit 204 to multiply the representation appearing at the output of the circuit 237 by the factor $x$. Assume, as in the specific example considered earlier above, that the outputs of the circuits 235 and 237 are then identical. In response thereto the comparator circuit 239 provides an enabling signal to close the switch 241, whereby the constant output of the circuit 235 is applied to the modulo 2 adder 243 to selectively alter the third information character then being applied thereto from the memory circuit 225.

As mentioned earlier, the arrangement of the specific illustrative system described herein is such that the output of the circuit 235 is actually equal to the error burst assumed to have occurred in the third information character $z_3$. Therefore, by adding this value to the erroneous third character, a corrected version of $z_3$ appears at the output of the adder 243 for application to the utilization circuit 250.

The operation of the specific illustrative receiving terminal 200 shown in FIG. 2 is such that the subsequent information characters $z_4$ through $z_7$ are passed in unmodified form from the memory circuit 225 via the adder 243 to the utilization circuit 250. This is so because the respective outputs of the error checking circuits 235 and 237 are identical only during that portion of a message block period in which $z_3$ appears at the output of the memory circuit 225. At all other times during a message period the outputs of the circuits 235 and 237 are not identical and, as a result, the switch 241 remains in its open-circuit position.

It is noted that the receiving terminal 200 shown in FIG. 2 is capable of operating continuously to process received message blocks, with a fixed delay equal to the length of one message block occurring between signals received from the channel 150 and those applied to the utilization circuit 250. It is to be further noted that each of the circuits 106 and 108 in FIG. 1 and the circuits 206, 208, 235 and 237 in FIG. 2 must be cleared after the processing of each message block. Clearing pulses for this purpose can be easily generated by the timing control circuits 104 and 204.

It is emphasized that by permitting the use of one relatively simple set of circuits (those shown in FIGS. 3 and 4) repeatedly at three different places in the illustrative system shown in FIGS. 1 and 2, and by requiring only a simply delay-type memory circuit in the receiving terminal 200, the system described herein represents an important and unobvious improvement over the arrangement described in my aforenoted copending application.

It is noted that the switches 231, 233 and 241 are shown in FIG. 2 in elementary schematic form simply to facilitate the understanding of the operation of the depicted system. In actual practice, however, these switches may, for example, be high speed electrically-actuated gating circuits of any form well known in the art. Also, although emphasis herein has been directed to two specific illustrative embodiments for the check character generating recalculating, and error checking circuits, it is to be understood that many other electrical, electromechanical or mechanical embodiments therefor are possible.

Furthermore, it is noted that the principles of the present invention are advantageously applicable to the transmission of $n$-digit teletypewriter characters between spaced transmitting and receiving terminals. In particular, these principles are well suited to the detection and correction of errors in a high speed multilevel modulation system for teletypewriter information. In such a system $n$-digit data words are encoded into $2^n-1$ different amplitude levels of a carrier frequency, and detection of the data at a receiving terminal involves discriminating among these different levels. The principles of the present invention may be easily applied to minimizing errors which occur in such a system when one amplitude level is mistaken for another.

Finally, it is to be understood that the above-described arrangements are only illustrative of the application of the principles of the present invention. Numerous other arrangements may be devised by those skilled in the art without departing from the spirit and scope of the invention.

What is claimed is:

1. Error correcting apparatus comprising a source of digital information characters, first means for iteratively combining said information characters to form two checking characters, second means for transmitting said information and check characters via a noisy medium, third means for iteratively combining said transmitted information and check characters to form two error characters, fourth means for iteratively operating on only one of said error characters until said one character is identical to the other error character, and means responsive to said fourth means indicating that said error characters are identical for correcting errors in said transmitted information characters.

2. A combination as in claim 1 wherein said first means comprises first and second check character generating circuits, said first generating circuit including means for iteratively adding together said information characters to form a first check character representative of the cumulative sum of said information characters, and said second generating circuit including linear sequential means for iteratively operating on said information characters to form a second check character.

3. A combination as in claim 2 wherein said first circuit includes means for generating a first check character $y_1$ according to the formula $$y_1 = \sum_{i=1}^{2^n-1} z_i$$

and said second circuit includes means for generating a second check character $y_2$ according to the formula $$y_2 = \sum_{i=0}^{2^n-2} A^{2^n-1-i} z_{i+1}$$

where $n$ is the number of binary digits in each information and check character, $z_i$ is the generic representation of an $n$-digit information character and $A$ represents a linear sequential operation.

4. A combination as in claim 3 wherein said second means includes circuitry for appending said two check characters to said information characters to form a redundant message block.

5. A combination as in claim 4 wherein said third means includes first and second recalculating circuits which are respectively identical to said first and second check character generating circuits.

6. A combination as in claim 5 wherein said fourth means includes first and second error checking circuits which are also respectively identical to said first and second check character generating circuits.

7. A combination as in claim 6 including output means, and a delay line coupled to said noisy medium for receiving information characters therefrom and for delivering said characters after a delay approximately equal to the period of a redundant message block to said output means in the order in which said characters were received.

8. In combination in an error control system, a source of information characters, and means responsive to said characters for generating two check characters $y_1$ and $y_2$ defined by the following expressions:

$$y_1 = \sum_{i=1}^{2^n-1} z_i$$

and $$y_2 = \sum_{i=0}^{2^n-2} A^{2^n-1-i} z_{i+1}$$

where $n$ is the number of binary digits in each information and check number, $z_i$ is the generic representation of an $n$-digit information character and $A$ represents a linear sequential operation.

9. A combination as in claim 8 further including means for appending said check characters to said information characters to form a redundant message block.

10. In combination in an error control system, means coupled to a noisy communication channel for receiving therefrom a redundant message block which comprises information characters and two check characters, means including first and second recalculating circuits responsive to a received message block for respectively recalculating two check characters from the received information characters and for adding said recalculated characters to said received check characters to form first and second error signals $e_1$ and $e_2$ defined as follows:

$$e_1 = \sum_{i=1}^{2^n-1} z_i + y_1$$

and $$e_2 = \sum_{i=0}^{2^n-2} A^{2^n-1-i} z_{i+1} + y_2$$

where $n$ is the number of binary digits in each information and check character, $y_1$ and $y_2$ are the received check characters, $z_i$ is the generic representation of an $n$-digit information character and $A$ represents a particular linear sequential operation.

11. A combination as in claim 10 further including a modification circuit, and means connected to said receiving means for storing received information characters for a time approximately equal to the period of a message block and then applying said characters to said modification circuit in sequence in the same order in which said characters were received.

12. A combination as in claim 11 further including means comprising first and second error checking circuits respectively identical to said first and second recalculating circuits and responsive to said first and second error signals for comparing said signals.

13. A combination as in claim 12 still further including means connected to one of said error checking circuits for successively transforming the output representation thereof in accordance with a linear sequential operation.

14. A combination as in claim 13 still further including means responsive to said comparing means sensing that the outputs of said first and second error checking circuits are identical for applying the output of the other one of said error checking circuits to said modification circuit to selectively alter the particular information character being applied at that time to said modification circuit.

References Cited by the Examiner

UNITED STATES PATENTS

| | | |
|---|---|---|
| 3,069,657 | 12/1962 | Green et al. |
| 3,114,130 | 12/1963 | Abramson _________ 340—146.1 |
| 3,155,818 | 11/1964 | Goetz __________ 340—146.1 X |
| 3,155,819 | 11/1964 | Goetz __________ 340—146.1 X |
| 3,159,810 | 12/1964 | Fire _____________ 340—146.1 |
| 3,213,426 | 10/1965 | Melas __________ 340—146.1 X |
| 3,222,643 | 12/1965 | Klinkhamer ________ 340—146.1 |
| 3,227,999 | 1/1966 | Hagelbarger _______ 340—146.1 |
| 3,273,121 | 9/1966 | Taylor ____________ 340—146.1 |

MALCOLM A. MORRISON, *Primary Examiner.*

M. J. SPIVAK, *Assistant Examiner.*

UNITED STATES PATENT OFFICE
CERTIFICATE OF CORRECTION

Patent No. 3,319,223                                                             May 9, 1967

Harry A. Helm

It is hereby certified that error appears in the above numbered patent requiring correction and that the said Letters Patent should read as corrected below.

Column 3, line 68, for "$x^8+x^4+x^3+1=0$" read -- $x^8+x^4+x^3+x+1=0$ --; column 4, line 19, for "principels" read -- principles --; column 6, line 22, for "represents" read -- represent --; same column 6, Table III, line 3 thereof, for "$y_2=x^2+x=011$" read -- $y_2=x=010$ --; equation (12), seventh item in the left-hand matrix, for "z" read -- $z_7$ --; last item in the right-hand matrix, for "$x^2+x$" read -- x --; same column 6, equation (15) should appear as shown below instead of as in the patent:

$$e_2 = \sum_{i=0}^{2^n-2} A^{2^n-1-i} z_{i+1} + y_2$$

column 7, equation (18), the first and eighth entries from the top of the vertical matrix for "$x_2+x$", each occurrence, read -- $x^2+x$ --; same equation, the last item in the vertical matrix, for "$x^2+x$" read -- x --.

Signed and sealed this 24th day of September 1968.

(SEAL)
Attest:

EDWARD M. FLETCHER, JR.                                EDWARD J. BRENNER
Attesting Officer                                             Commissioner of Patents